No. 772,027. PATENTED OCT. 11, 1904.
G. F. BUTTERFIELD.
RUBBER SOLED LEATHER BOOT OR SHOE.
APPLICATION FILED OCT. 28, 1901.
NO MODEL.

Witnesses:
Charles F. Logan.
M. C. Powell

Inventor:
George F. Butterfield.
by N. C. Spencer
Atty.

No. 772,027. Patented October 11, 1904.

UNITED STATES PATENT OFFICE.

GEORGE F. BUTTERFIELD, OF FRAMINGHAM, MASSACHUSETTS, ASSIGNOR TO GRACE I. BUTTERFIELD, OF BOSTON, MASSACHUSETTS.

RUBBER-SOLED LEATHER BOOT OR SHOE.

SPECIFICATION forming part of Letters Patent No. 772,027, dated October 11, 1904.

Application filed October 26, 1901. Serial No. 80,057. (No model.)

*To all whom it may concern:*

Be it known that I, GEORGE F. BUTTERFIELD, of Framingham, in the county of Middlesex and State of Massachusetts, have invented certain new and useful Improvements in Rubber-Soled Leather Boots or Shoes, of which the following is a specification.

The object of this invention is to permanently secure rubber soles to the bottoms of leather shoes in a simple but most effective manner, involving as a final step in the fastening process the vulcanization of the rubber compound after its application to the shoe. I first last the shoe, securing the upper, the inner sole, and the welt to each other by the channel-seam, preferably formed of thread saturated with vulcanizable rubber in liquid form, the stock being practically free from grease or other impurities. Then I apply along the welt and margin of the sole-bottom a strip of raw unvulcanized rubber compound about an inch in width and press it down upon the welt, the seam, and the adjacent portion of the inner sole. After this I cover the sole-bottom and said marginal rubber strip with a very thin layer of sheet-copper sole-shaped to conform to said parts, but of slightly less area, so that the metal, while adhering to such rubber strip, shall not protrude beyond the welt. I next stitch or otherwise secure this copper layer marginally to the welt and then press the copper-covered bottom of the lasted shoe upon the raw or partially-cured surface of a vulcanizable-rubber sole or sole and heel contained in a mold having a vulcanizing steam-chamber adjacent thereto, and, finally, I vulcanize to said copper sheet the rubber forming said strip and the surface of that contained in said mold, whereby such strip is caused to adhere tenaciously to the leather and the edges of the copper sheet, producing a water-tight joint, and the outer tread-sole of rubber takes a permanent hold upon the entire bottom of said sheet, the peculiar affinity of vulcanizable rubber for copper being utilized in my improved product.

Figure 1:
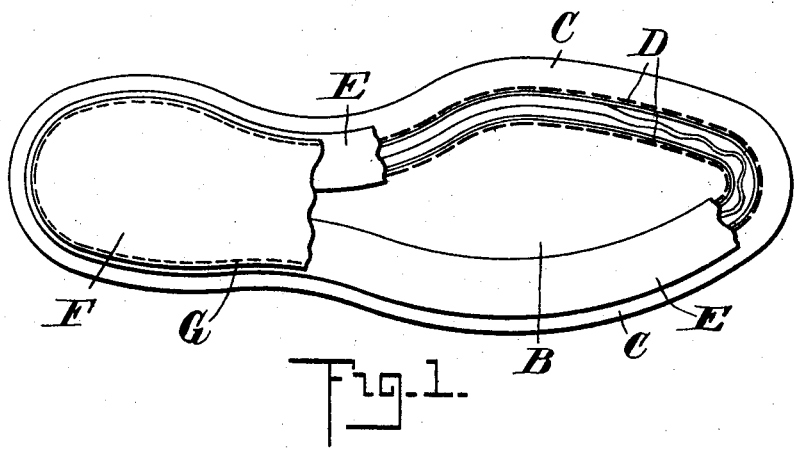
Figure 2:
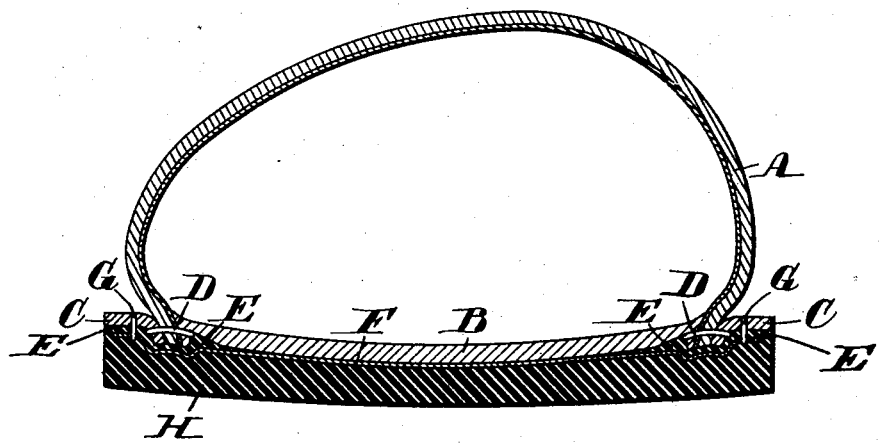

In the drawings, Figure 1 is a plan of the sole-bottom, showing in the upper right-hand portion the welt, the channel-seam, and adjacent part of the unfinished insole or bottom of a lasted shoe, the lower right-hand portion showing a rubber strip covering such seam and welt and the left half representing a copper sheet covering the parts and stitched marginally to the welt. Fig. 2 is a transverse section of a finished shoe having the parts indicated in Fig. 1 with an outer or tread sole of compounded rubber vulcanized permanently thereon.

A represents the upper-leather and lining of the shoe, B the inner sole, and C the welt, these parts being united to each other by the channel-seam D, which I stitch mechanically with thread saturated with vulcanizable rubber in liquid form, so as promote the adhesion of the rubber along the seam, instead of using wax, which would repel it.

E is a thin strip of valcanizable-rubber compound, about an inch wide, covering the seam D, the under side of the welt C, and the adjacent portion of the inner sole B and pressed thereon, so as to adhere temporarily thereto and fill the interstices of the seam and the inequalities of the insole and welt, largely excluding the air therefrom.

F represents a very thin and flexible sole-shaped layer of sheet-copper covering the bottom of the inner sole and extending out marginally upon the rubber strip E nearly to the outer edge of the welt all around. This layer or sheet conforms generally to the surface of the inner sole, to which it is held temporarily by the adhesion of the vulcanizable strip E and otherwise, if desired. I next secure this sheet F to the welt C by the marginal seam G, sewed through the welt, the plastic strip E, and the margin of said layer or sheet. This seam G is also formed with rubber-saturated thread or, if preferred, with a fine copper wire for better adhesion to the rubber. Upon this foundation I vulcanize the outer sole H, Fig. 2, the unvulcanized or partially-vulcanized rubber compound which is to form the sole being held in a sole-shaped mold and subjected to a vulcanizing heat while the shoe formed as stated and held on a last is pressed thereon by suitable mechanism. The steam-chamber for vulcanizing the rubber will be located beneath the mold, as shown in various patents of mine, and as the rubber expands during this operation it takes a firm hold upon the copper sheet F, which is thereby forced upwardly into close contact with the inner sole B, the softened strip E, and any surplus of rubber in the mold working into any spaces between the inner sole and said sheet and being vulcanized to both and to said saturated seams.

I claim as my invention—

1. A leather boot or shoe having a sole-shaped layer of thin sheet-copper secured marginally to the welt thereof, and provided with a strip of compounded rubber interposed marginally between such layer and the inner sole, and with an outer tread-sole of such rubber, vulcanized directly upon said copper layer and inclosing the edges thereof, substantially as set forth.

2. A leather boot or shoe having a sole-shaped layer of thin, flexible, sheet-copper secured beneath its inner sole by a marginal seam formed of thread saturated with vulcanizable rubber in liquid form, and provided with an outer tread-sole of compounded rubber, vulcanized directly upon said copper layer, and inclosing its edges, substantially as set forth.

In testimony whereof I have affixed my signature in presence of two witnesses.

GEORGE F. BUTTERFIELD.

Witnesses:
  A. H. SPENCER,
  M. C. POWER.